United States Patent [19]

Nagano et al.

[11] 3,915,254
[45] Oct. 28, 1975

[54] PASSIVE SEAT BELT ARRANGEMENT FOR AUTOMOTIVE VEHICLES

[75] Inventors: Toshio Nagano, Tokyo; Shyouichi Koike, Seki; Akihiro Hashimoto, Tokyo; Shuji Nagase, Koganei; Akira Hoshino, Tachikawa, all of Japan

[73] Assignee: Nissan Motor Company Limited, Yokohama, Japan

[22] Filed: Feb. 4, 1974

[21] Appl. No.: 439,278

[30] Foreign Application Priority Data

| June 16, 1973 | Japan | 48-68023 |
| June 16, 1973 | Japan | 48-68024 |
| June 16, 1973 | Japan | 48-68025 |
| June 16, 1973 | Japan | 48-68026 |

[52] U.S. Cl. .................. 180/82 C; 280/150 SB
[51] Int. Cl.² .................................. B60R 21/02
[58] Field of Search ........... 280/150 SB; 180/82 C; 297/388, 389

[56] References Cited
UNITED STATES PATENTS

| 3,781,061 | 12/1973 | Walz et al. | 180/82 C |
| 3,815,934 | 6/1974 | Weststrate | 280/150 SB |
| 3,827,713 | 8/1974 | Saurai | 280/150 SB |
| 3,842,929 | 10/1974 | Wada et al. | 180/82 C |

*Primary Examiner*—Robert R. Song

[57] ABSTRACT

A passive seat belt arrangement for an automotive vehicle, comprising a lap belt which has an occupant-restraining position extending across a seat of the vehicle and an unrestraining position extending from below the seat forwardly toward a front end of a door adjacent the seat and thereafter rearwardly toward a rear lower portion of the door, and a shoulder strap which has an occupant restraining position extending over the seat from a vehicle body side member above the seat and an unrestraining position extending forwardly from the body side member and thereafter rearwardly and downwardly. The seat belt arrangement is actuated into the occupant-restraining condition when concurrently the door is closed, the seat is occupied and an ignition system of the vehicle is energized and is brought out of such a condition when the door is open, or when the ignition system is de-energized with the door closed.

9 Claims, 10 Drawing Figures

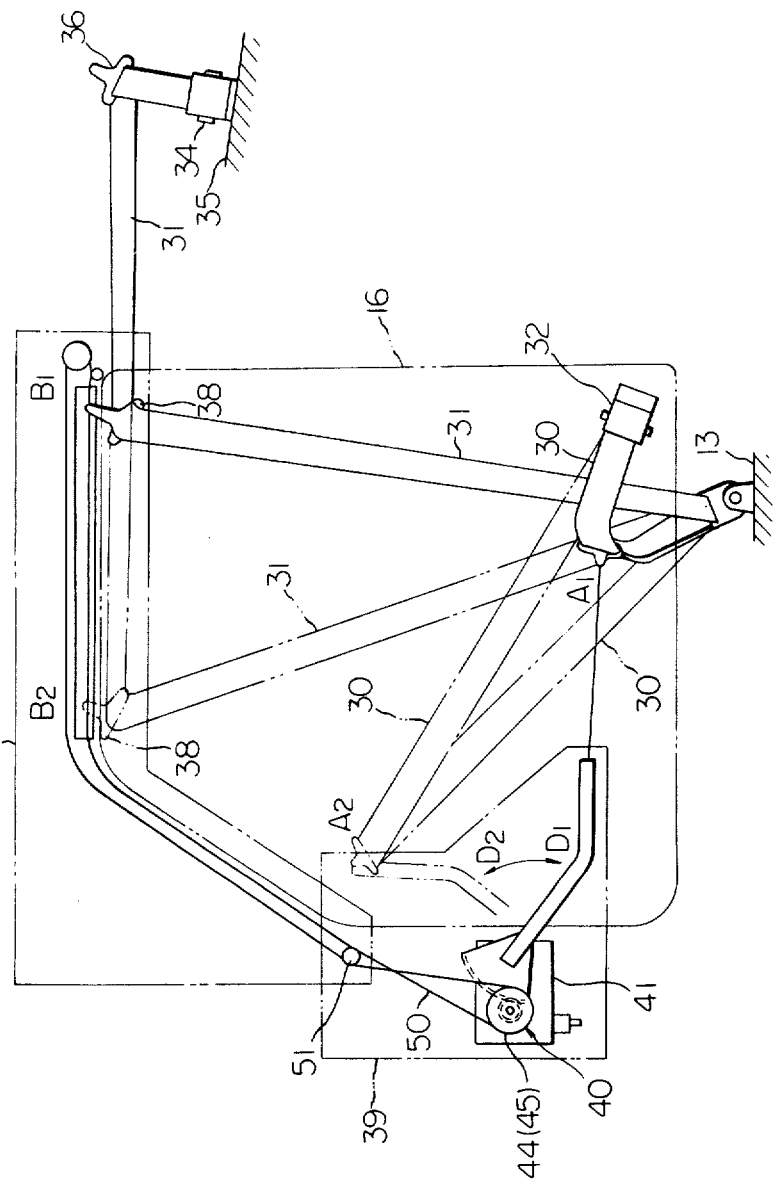

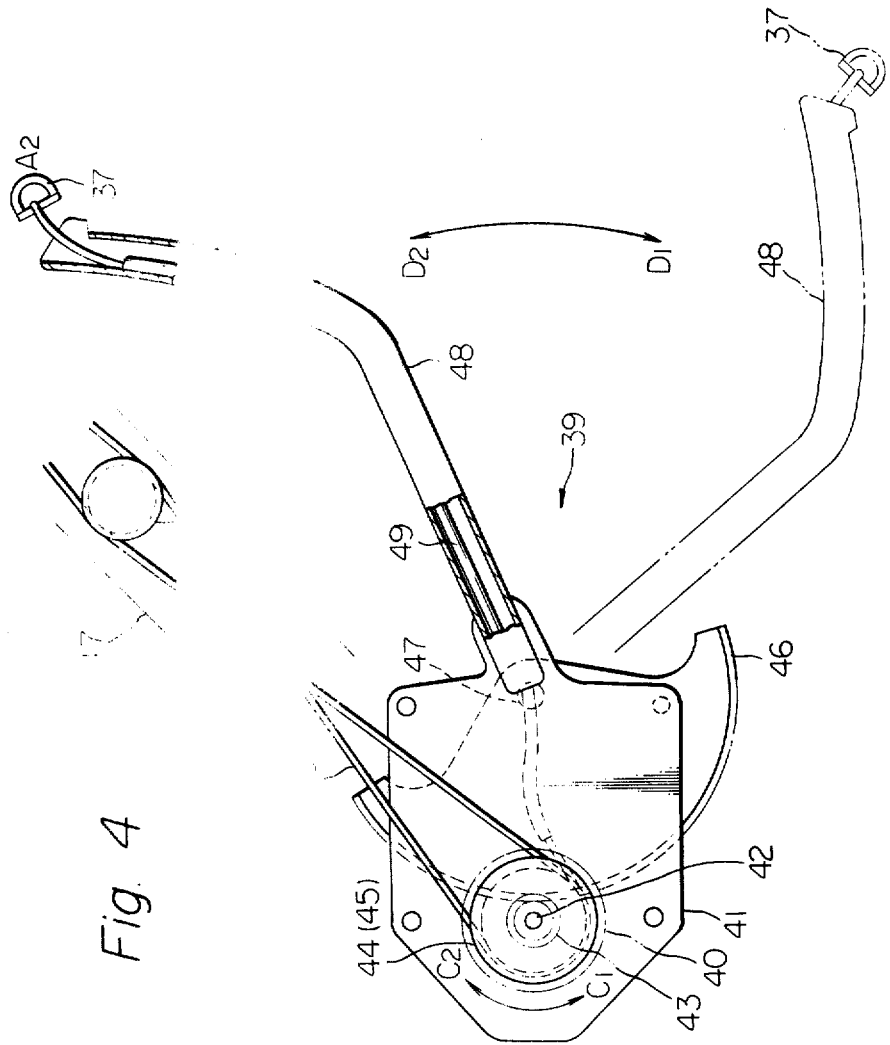

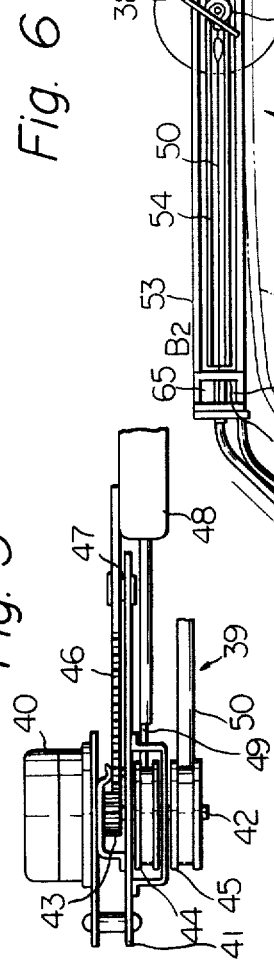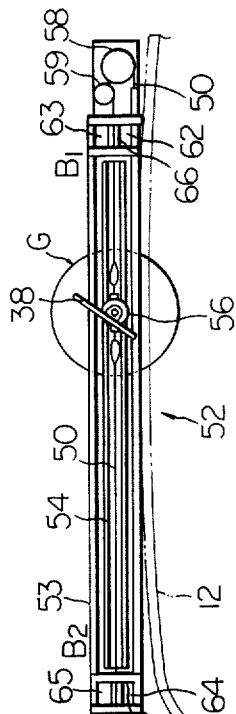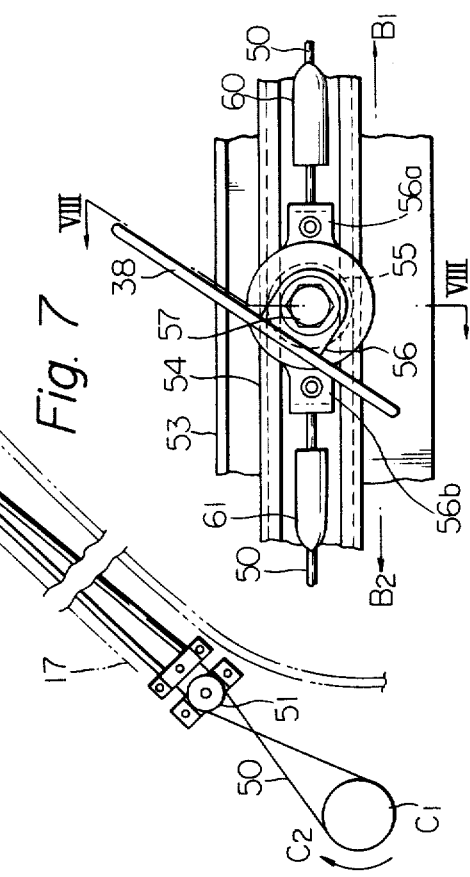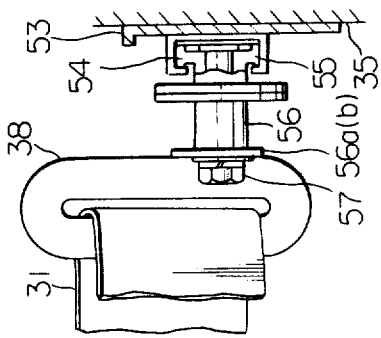

PASSIVE SEAT BELT ARRANGEMENT FOR AUTOMOTIVE VEHICLES

The present invention relates to vehicle safety devices and particularly to safety belt arrangements for use in automotive vehicles. The safety belt arrangements are adapted to restrain occupants of the vehicles in protected conditions for preventing the occupants from being violently flung forward and consequently injured in the event of, for example, sudden stops, abrupt deceleration or collisions, especially frontal collisions, of the automotive vehicles.

While a variety of safety belt arrangements for the automotive vehicles have been proposed and are presently in use, the present invention has a particular reference to a seat belt arrangement of the type which uses a combination of a shoulder strap and a lap belt which are mounted in association with a seat of the vehicle. When the seat belt arrangement of this nature is held in an occupant restraining or protective condition, the shoulder strap extends across and bears against the chest of the occupant of the seat and the lap belt is taut on the belly of the seat occupant so that the occupant is provided with the desired safety and restraint but the comfort or normal freedom of the occupant will not be impaired. The seat belt arrangement is maintained inoperative when the vehicle is inoperative or in the absence of an occupant in the vehicle or on the vehicle seat and is actuated into the occupant-restraining condition either manually by the occupant himself or in an automatic fashion responsive to operative conditions of the vehicle. The present invention is, still more particularly, directed to the seat belt arrangement of the character in which the shoulder strap and lap belt are automatically moved into and out of the occupant-restraining positions in response to predetermined operative conditions of the automotive vehicle. The vehicle seat belt arrangement of this character is known as the "passive" seat belt device and there is an increasing tendency that such seat belt arrangements are incorporated in the automotive vehicles of modernized makes and models to provide assurance of safety during cruising of the automotive vehicles.

In a typical example of the prior art passive or automatically controlled vehicle seat belt arrangement using the combination of the shoulder strap and the lap belt, the lap belt associated with a vehicle seat is connected at one end to a rear inboard lower portion of the door structure adjacent the seat and at the other end to the vehicle body floor adjacent the inboard side end of the seat opposite to the door structure while the shoulder strap cooperating with the lap belt is connected at one or upper end to a central portion of the vehicle body roof and at the other or lower end to an intermediate portion of the lap belt. The lap belt and the shoulder strap are connected to the door structure and the vehicle body floor through automatic locking retractors which are mounted on or in the neighbourhood of the specified portions of the door structure and the floor so that the lap belt and the shoulder strap are biased to their respective occupant-restraining positions which are locked when the lap belt and the shoulder belt are taut. A control belt is connected at one end to a motor-driven belt drawer and at the other end to an apertured belt carrier which is longitudinally movably engaged by the lap belt. The motor-driven belt drawer is held in position in front of the seat and adjacent to a vertically central inboard portion of the front edge of the door structure. The belt drawer is held inoperative when the door structure is closed and is driven by the motor to pull and roll therein the control belt in response to opening movement of the door structure. As the control belt is thus pulled forwardly of the seat toward the vertically central inboard portion of the front edge of the door structure, the lap belt which is linked with the control belt by the apertured carrier is withdrawn from the associated locking retractor mounted on the door structure and as a consequence finally extends in part over an upper face of the seat and in part generally diagonally alongside the inner face of the door structure. When the lap belt is moved into this position, the shoulder strap connected to the intermediate portion of the lap belt extends from the central portion of the vehicle body roof toward the front end portion of the door structure obliquely across and over the seat. The seat belt arrangement in its entirety is in this manner maintained in an inoperative insofar as the door structure is open and irrespective of the presence or absence of an occupant of the seat.

When the door is closed, the belt drawer is made, inoperative to pull the control belt which is consequently allowed to be withdrawn or, in some cases, positively driven to be paid from the belt drawer by reason of an increase in the tension of the lap belt which is forcibly longitudinally retracted into the associated locking retractor mounted on the door structure. As the lap belt is thus longitudinally contracted in response to the closing movement of the door structure, the shoulder strap is also longitudinally contracted by reason of the retracting bias exerted by the associated locking retractor mounted on the underside of the vehicle body roof. When the door structure is closed completely and the belt arrangement as a whole is brought into the operative condition restraining (if the seat is occupied by a vehicle occupant) or ready to restrain (in the absence of a seat occupant) the occupant, the apertured carrier interconnecting the lap and control belts is moved to the locking retractor mounted on the door structure with the result that the control belt extends alongside of and generally diagonally with respect to the inner face of the door structure from the rear inboard lower portion of the door structure toward the belt drawer located in the vicinity of the vertically central portion of the front edge of the door structure. Under these conditions, the lap belt overrides the seat and the shoulder strap extend obliquely from the central portion of the vehicle body roof toward the outboard end of the seat, thereby bearing or ready to bear the belly and breast, respectively, of the seat occupant.

In the prior art passive seat belt arrangement of this nature, drawbacks are encountered as follows:

1. Because of the fact that the shoulder strap is connected to the central portion of the vehicle body roof which is rather deficient in rigidity and resistance to warpage and deformation, the roof is liable to be deformed by an impact exerted on the shoulder strap in the event of a sudden stop or deceleration or a collision of the vehicle. This will result in failure or inability of the seat belt arrangement to successfully protect the occupant of the vehicle from injury in case of such an accident.

2. Since the shoulder belt obliquely extends across the space in the occupant compartment when the seat belt arrangement is in the occupant-restraining position, driver's rear viewing is obstructed by the shoulder belt which is located in part in the path of the driver's rear view sight.

3. When the seat belt arrangement is in the occupant-restraining position, moreover, the control belt extends alongside the inner face of the door structure, providing an obstacle to the occupant's access to those functional parts such as the window regulator knob, the door-latch inside knob, the door inside handle and the arm rest which are mounted on the inner wall of the door structure.

4. There is a danger of the control belt interferring with the manipulative motions of the driver when the seat belt arrangement is in the position restraining the driver.

5. When the door is open and accordingly the seat belt arrangement is in the inoperative position, the shoulder strap remains to extend across and over the seat so that the occupant leaving the vehicle or an intending occupant entering the vehicle may be impeded by the shoulder strap.

6. Because of the fact that the seat belt arrangement is controlled solely in response to the opening or closing movement of the door structure, the arrangement is held in the operative position even when the vehicle or the seat is left unoccupied. The vehicle occupant could not stay on the seat in a free or unrestrained condition unless the door structure is left open.

The present invention contemplates elimination of all these drawbacks that are inherent in the prior art vehicular seat belt arrangements of the passive or automatically actuated type.

It is, therefore, an important object of the present invention to provide an improved passive seat belt arrangement which is capable of reliably and efficiently protecting an occupant of an automotive vehicle in the event of a sudden stop, abrupt deceleration and/or a collision of the automotive vehicle.

It is another important object of the present invention to provide an improved passive seat belt arrangement which will not create an obstacle to driver's rear viewing during cruising of the automotive vehicle when the seat belt arrangement is held in an operative or occupant-restraining condition.

It is still another important object of the present invention to provide an improved passive seat belt arrangement which will not interfere with the occupant's normal motions to operate the vehicle or to manipulate the functional parts, espectially those mounted on the door structure, of the vehicle when the seat belt arrangement is in the occupant-restraining condition.

It is still another important object of the present invention to provide an improved passive seat belt arrangement which will permit an occupant or an intending occupant of an automotive vehicle to smoothly leave or enter the vehicle when the vehicle is at rest and accordingly the seat belt arrangement is in an unrestraining condition.

It is still another important object of the present invention to provide an improved passive seat belt arrangement which is maintained inoperative or unrestraining condition when the vehicle or at least a seat equipped with the seat belt arrangement is unoccupied.

Yet, it is another important object of the present invention to provide an improved passive seat belt arrangement which is simple in construction, economical to manufacture and ready to be installed on an automotive vehicle of any type.

In accordance with the present invention, these and other objects will be accomplished basically in a passive seat belt arrangement which comprises a first flexible elongated member (to be referred to as a lap belt in the description of an embodiment of the invention) which is connected at one end to a rear inboard lower portion of a door structure adjacent an outboard side end of a seat of an automotive vehicle and which is connect at the other end to a vehicle body floor member located substantially below an inboard side end of the seat, a second flexible elongated member (to be referred to as a shoulder strap in the description of the embodiment) which is connected at one end to a rigid vehicle body structural member adjacent to a side edge of a vehicle body roof and located upwardly and rearwardly of the seat and which is connected at the other end to the vehicle body floor member below the inboard side end of the seat, each of the first and second flexible elongated members being movable between an occupant-restraining position restraining an occupant of the seat and an unrestraining position permitting the occupant to be released therefrom, first and second releasable biasing an locking means for biasing the first and second flexible elongated members, respectively, to their occupant-restraining positions and holding the flexible elongated member to be locked when the members are taut, a first carrier member which is movable in a predetermined path substantially in a fore-and-aft direction of the vehicle and alongside of a lower inboard portion of the door structure between a first position close to the end of the first flexible elongated member fixed to the door structure and a second position forward of the seat and by which the first flexible member is longitudinally movably received at its intermediate portion, the first flexible elongated member being moved to the occupant-restraining position thereof when the first carrier member is moved to the first position thereof and to the unrestraining position when the first carrier member is moved to the second position thereof, a second carrier member which is movable in a predetermined path substantially in a fore-and-aft direction of the vehicle along and inboardly of the aforesaid side edge of the vehicle roof between a first position close to the end of the second flexible elongated member fixed to the aforesaid rigid vehicle body structural member and a second position forward and upward of the seat and by which the second flexible elongated is longitudinally movably received at its intermediate portion which is accordingly movable between the first and second positions of the second carrier member, the second flexible elongated member being moved to the occupant-restraining position thereof when the second carrier member is moved to the first position thereof and to the unrestraining position when the second carrier member is moved to the second position thereof, guide means for guiding the second carrier member along the predetermined path between the first and second positions thereof, drive means for driving the first and second carrier members so as to concurrently move between the respective first and second positions thereof, and electric control means responsive to predetermined operative and inoperative conditions of the vehicle for causing the drive means to drive the first and second carrier members to the respective first positions thereof in response to the predetermined operative condition of the vehicle and to the second positions thereof in response to the predetermined inoperative conditions of the vehicle. The electric control means may comprise first switch means responsive to an energized or de-energized condition of an ignition system of the vehicle, second switch means responsive to an occupied or unoccupied condition of the seat equipped with the seat belt arrangement, and third switch means responsive to a closed or open condition of the door structure of the door structure adjacent the seat. The control means thus becomes operative to control the drive means for moving the first and second carrier members to move to the respective first positions thereof in response concurrently to the energized condition of the ignition system, the occupied condition of the seat and the closed condition of the door structure and to the respective second positions thereof in response to at least one of the de-energized condition of the ignition system the unoccupied condition of the seat and the open condition of the door structure.

The drive means may comprise a driving source which has an output shaft rotatable in first and second directions and which is energized by the control means so as to cause the output shaft to rotate the first or second direction when the control means respond to the predetermined operative or inoperative conditions, respectively, of the vehicle, first and second rotary members which are rotatable with the output shaft of the driving source, a tubular elongated member whichi is mounted through a pivot on a stationary member of the vehicle body structure located in the vicinity of the second position of the first carrier member and which is rotatable between a first angular position extending substantially horizontally toward the first position of the first carrier and a second angular position which is substantially upright from the pivot to have its upper end located in the vicinity of the second position of the first carrier member, power transmission means interconnecting the output shaft of the driving source and the hollow elongated member for moving the tubular elongated member to the first or second angular position thereof when the driving source is actuated by the control means for causing the output shaft to rotate in the first or second direction, respectively, a first flexible line which is longitudinally movably passed throughout the tubular elongated member and which is connected at one end to the first carrier member and at the other end to the first rotary member, the first flexible line having a first condition extended from the first rotary member and terminating at the above mentioned one end thereof in the vicinity of the first position of the first carrier member and a second condition shortened toward the first rotary member, the first flexible line being driven by the driving source through the first rotary member into the first condition thereof to allow the first carrier member to move its first position when the output shaft of the driving source is rotated in the first direction thereof and into the second condition to move the first carrier member to the second position thereof when the output shaft of the driving source is rotated in the second direction thereof, and a second flexible line which is interconnected between the second carrier member and the second rotary member and movable in a first direction to move the second carrier member to the first position thereof and a second direction to move the second carrier member to the second position thereof, the second flexible line being driven from the driving source through the second rotary member in the first or second direction thereof when the output shaft of the driving source is rotated in the first or second direction, respectively, thereof.

The guide means may comprise a guide rail which is fixedly mounted on a rigid vehicle body structural member adjacent to the previously mentioned side edge of the vehicle body roof and which longitudinally extends substantially in the fore-and-aft direction of the vehicle along the predetermined path of the second carrier member, the guide rail having a rear end located in the vicinity of the first position of the second carrier member and a front end located in the vicinity of the second position of the second carrier member, and a guide roller which is movable on the guide rail between the rear and front ends of the rail and which is rigidly connected to the second carrier member.

The features and advantages of the passive seat belt arrangement according to the present invention as constructed basically as above described will become more apparent from the following description taken in conjunction with the accompanying drawings in which:

FIG. 3 is a schematic side elevational view which illustrates general constructions of drive and guide means forming part of the seat belt arrangement shown in FIG. 1;

FIG. 4 is a side elevational view which shows, to an enlarged scale, details of the drive means illustrated in FIG. 3;

FIG. 5 is a top end view of the details of the drive means illustrated in FIG. 4;

FIG. 6 is a side elevational view which shows, also to an enlarged scale, details of the guide means forming part of the seat belt arrangement illustrated in FIG. 5;

FIG. 7 is a side elevations view showing, to a further elongated scale, a portion VII of the guide means illustrated in FIG. 6;

FIG. 8 is a cross sectional view taken on line VIII—VIII of FIG. 7;

Figure 1:
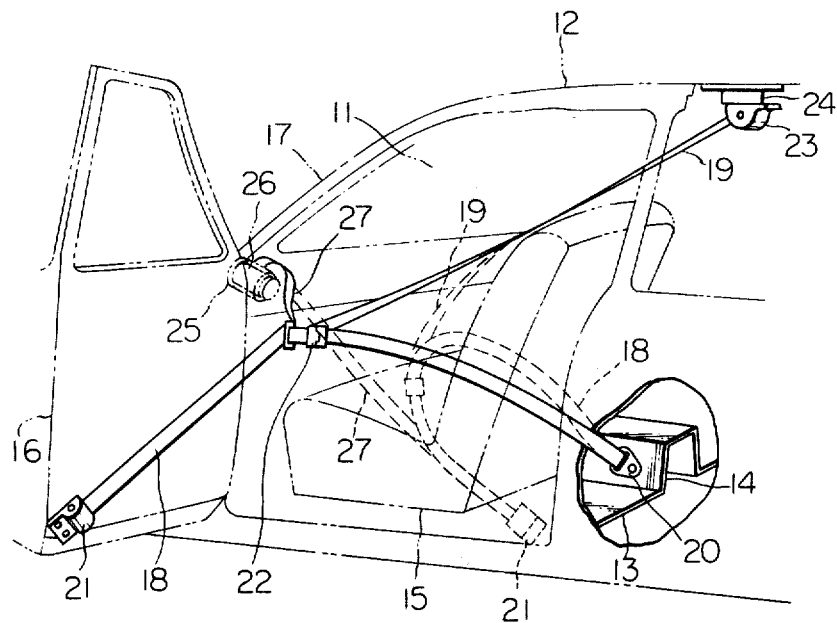
FIG. 1 is a perspective view showing an example of the prior art passive seat belt arrangement using a combination of a lap belt and a shoulder strap, wherein full lines indicate the seat belt arrangement in the inoperative or occupant-unrestraining condition and broken lines indicate the arrangement in the operative or occupant-restraining condition.

Reference will now be made to the drawings, first to FIG. 1 which illustrates the example of the prior art passive seat belt arrangement using the combination of the lap belt and the shoudler strap. The seat belt arrangement is mounted within an occupant compartment 11 which is defined by a roof member 12 and a floor member 13 of a body structure of an automotive vehicle. The floor member 13 has a longitudinal transmission tunnel 14 and carries a seat 15 which is shown as a front seat by way of example. A door structure 16 is hingedly connected at its front edge to a suitable rigid vertical member, usually a front piller 17, forming part of the vehicle body structure.

In association with the seat 15 and the door structure 16 is provided a combination of a lap belt 18 and a shoulder strap 19 to protect an occupant of the seat. The lap belt 18 is anchored at one end to the transmission tunnel 14 by means of a bracket 20 and connected at the other end to a rear inboard lower portion of the door structure 16 through a releasable locking retractor 21 which is fixedly mounted on an inner wall member of the door structure 16. The lap belt 18 thus extends across the seat 15 and is adapted to bear on a belly of an occupant of the seat 15 when held in an operative or occupant-restraining condition. The shoulder strap 19, on the other hand, is retained through a buckle connection 22 to an intermediate portion of the lap belt 18 and connected at the other end to a central portion of the vehicle body roof member 12 through a releasable locking retractor 23 which is carried by a bracket 24 fixedly mounted on the underside of the vehicle body roof member 12. The shoulder strap 19 thus extends generally obliquely through the occupant compartment from the central portion of the roof member 12 toward an upper face of the seat 15 and is adapted to bear against the chest of an occupant of the seat when held in an operative or occupant-restraining position.

A motor 25 is mounted on vehicle body structural member which is located in the neighborhood of a vertically central portion of the hinged front edge of the door structure 16, viz., forwardly and upwardly of the upper face of the seat 15. The motor 25 has an output shaft (not shown) which is in driving engagement with a belt puller 26 from which a control belt 27 extends. The control belt 27 is connected at its leading end to a portion of the lap belt 18 intermediate between the retractor 21 and the buckle connection 22 through an apertured carrier member 28 which is secured to the leading end of the control belt 27 and slidably receiving in its aperture the lap belt 18 as shown. The motor 25 is responsive to an opening movement of the door structure and is operative, when energized, to drive the belt puller 26 so that the control belt 27 is forcibly pulled to and rolled within the belt puller 27.

When, thus, an intending occupant of the vehicle opens the door structure 16, the motor 25 is energized and accordingly the belt puller 26 is driven by the motor 25 so as to pull the control belt 27 forwardly and upwardly of the seat 15. The lap belt 18 connected to the control belt 27 through the apertured carrier member 28 is consequently drawn from the locking retractor 21 on the door structure 16 so that the intermediate portion of the lap belt 18 is moved toward the belt puller 26. As the lap belt 18 is driven by the control belt 27 in this manner, the shoulder strap 19 joined to the intermediate portion of the lap belt 18 through the buckle connection 28 is driven by the lap belt 18 so as to have its lower end moved toward the belt puller 26. When the intermediate portion of the lap belt 18 is thus moved close to the belt puller 26, the lap belt 18 extends in part upwardly and forwardly from the transmission tunnel 14 of the floor member 13 toward the belt puller 26 and in part downwardly and rearwardly from the belt puller 26 to the locking retractor 21 on the door structure 16 while the shoulder strap 19 extends downwardly and forwardly from the locking retractor 23 on the roof member 12 toward the belt puller 26, as indicated by the full lines in FIG. 1.

When, then, an occupant of the vehilce is seated on the seat 15 and closes the door structure 16, the motor 25 drives the belt puller 26 to pay the control belt 27 therefrom so that the lap belt 18 and the shoulder strap 19 are drawn by the associated locking retractors 21 and 23, respectively, until the apertured carrier member 28 is moved close to the locking retractor 21 on the door structure 16 which is closed. Under these conditions, the lap belt 18 override the upper face of the seat 15 and extends across the occupant's lap or thighs while the shoulder strap 19 extends upwardly and forwardly from the vicinity of the locking retractor 21 on the door structure and through the occupant's chest and shoulder upwardly and rearwardly to the locking retractor 23 carried on the central portion of the roof member 12 of the vehicle body structure. The motor 25 may be held at rest upon closing of the door structure 16 so that the control belt 27 is allowed to withdraw therefrom as it is pulled rearwardly by the intermediate portion of the lap belt 18.

The various drawbacks previously pointed out as being inherent in the prior art passive seat belt arrangements result from the above described construction in which the bracket 24 to support the shoulder strap 19 is fixed to the roof member 12 of the vehicle body structure and the lap belt 18 and the shoulder strap 19 are driven through the control belt 27 from the belt puller 26 which located forwardly and upwardly of the upper face of the seat 15. Since, for one thing, the shoulder strap 19 secured at its upper end to the vehicle body roof member 12 which is less rigid in vertical direction than the structural members supporting the roof member, the roof member 12 is liable to be locally warped or deformed downwardly into the occupant compartment 11 when the shoulder strap 19 is violently forced downward and forward by a force of inertia developed in a vehicle occupant restrained by the shoulder strap in the event the vehicle is subjected to a sudden deceleration as in the case of a collision. As a result of such a localized warpage or deformation of the roof member 12, the seat belt arrangement may fail to securely restrain and hold the vehicle occupant and may accordingly be unable to successfully protect the occupant during, for example, a frontal collision of the vehicle. When, moreover, the seat belt arrangement is held in the occupant-restraining condition, the shoulder strap 19 extends obliquely through the occupant compartment 11 and, at the same time, the control belt 27 extends diagonally alongside of the inner face of the door structure 16, the shoulder strap 19 will create an obstacle to the rear viewing of the occupant of the seat 15 or, in this context, the driver of the vehicle and the control belt 27 will create an obstacle to the occupant's access to the functional parts such as for example the window ragulator knob, the door-latch inside knob, the door inside handle and the arm rest (all not shown) mounted on the inner wall member of the door structure 16, as previously mentioned. The control belt 27, which is located adjacent a shoulder and an arm of the occupant of the seat 15, may impede the manipulative actions of the occupant or in this context the driver to operate the vehicle. When, on the other hand, the seat belt arrangement is in the occupant-unrestraining condition which is indicated by the full lines in FIG. 1, the shoulder strap 19 is left to extend diagonally in the occupant compartment 11 and may therefore create an obstacle to an egress of the vehicle occupant from or to an ingress of an intending vehicle occupant to the occupant compartment 11. Since, furthermore, the seat belt arrangement can not be brought into the occupant-restraining condition unless the door structure 16 is closed, the occupant of the vehicle could not stay in the vehicle in an unrestrained condition even when the ignition system is de-energized. The goal of the present invention is to eliminate all these problems which are encountered in the prior art passive seat belt arrangements of the described character.

Figure 2:
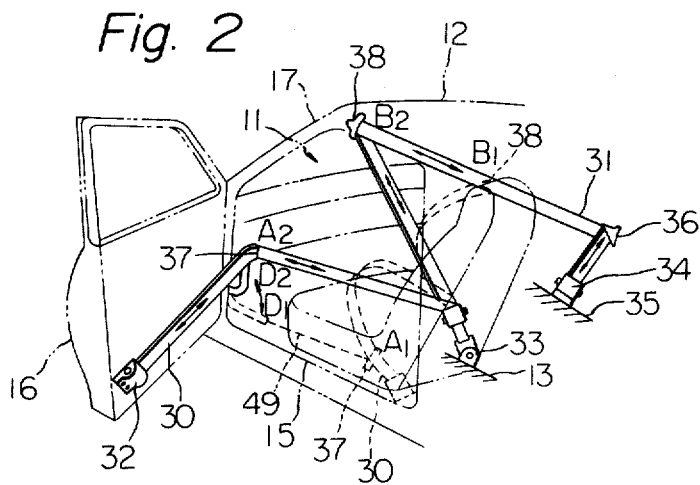
FIG. 2 is a perspective view which shows a preferred embodiment of the passive seat belt arrangement according to the present invention, wherein full lines and broken lines indicate the seat belt arrangement in the occupant-unrestraining and occupant restraining conditions, respectively, similarly to FIG. 1.

Reference is now be made to FIG. 2 which illustrates a preferred embodiment of the passive seat belt arrangement which is adapted to achieve such a goal. Similarly to the arrangement shown in FIG. 1, the seat belt arrangement according to the present invention is herein illustrated as being mounted in association with a front seat of the vehicle but it is apparent that the seat belt arrangement according to the present invention can be installed in conjunction with any other seat such as for example a rear seat of the vehicle. In FIG. 2, those members and structures which have their counterparts in FIG. 1 are designated by like reference numerals.

The passive seat belt arrangement according to the present invention comprises a combination of a lap belt 30 and a cooperating shoulder strap 31. The lap belt 30 is connected at one end to a rear inboard lower portion of the door structure 16 through a releasable locking retractor 32 which is fixedly mounted on the inner wall member of the door structure 16. The locking retractor 32 is operative not only to impart a biasing force to the lap belt 30 so that the lap belt is urged to retract to the retractor but to hold the lap belt 30 locked when the lap belt 30 is taut during the occupant-restraining condition of the seat belt arrangement. The lap belt 30 is anchored at the other end to the vehicle body floor member 13 through a bracket 33 which is fixedly mounted on that portion of the floor member 13 which is located adjacent to a rear inboard side end of the seat 15. The shoulder strap 31, on the other hand, is stitched or otherwise anchored at one or lower end to that portion of the lap belt 30 close to the bracket 33 on the floor member 13 and is connected through a releasable locking retractor 34 to a suitable rigid body structural member 35 adjacent to a longitudinal side edge (not shown) of the vehicle body roof member 11 and located above and at the rear of the seat 15. A preferred example of the rigid structural member 35 thus carrying the locking retractor 34 will be a roof side rail or a vehicle body piller located upward and rearward of the seat 15. Where the locking retractor 34 is thus secured to the roof side rail or the piller, the shoulder strap 31 may be passed through an apertured carrier 36 which is fitted to the vehicle body structural member located slightly above the roof side rail or the piller. The locking retractor 34 is similar in effect to the retractor 32 for the lap belt 30 and is operative to urge the shoulder strap 31 to be retracted to the retractor 34 and to hold the shoulder strap 31 locked when the shoulder strap is taut during the occupant-restraining condition of the seat belt arrangement. The shoulder belt 31 has been described as being stitched or otherwise joined to the portion of the lap belt 30 close to the braket 33, the same may be anchored directly to the bracket 33 or, otherwise, through an independent bracket to the vehicle body floor member 13, where desired.

The lap belt 30 and the shoulder strap 31 are retained at their longitudinally intermediate portions to apertured carrier members 37 and 38, respectively. As will be described in more detail, the carrier member 37 retaining the lap belt 30 is movable between a first position $A_1$ close to the retractor 32 on the door structure 15 in the closed position and a second position $A_2$ close to the front higned end of the door structure 15 while the carrier member 38 retaining the shoulder strap 31 is movable along the longitudinal side edge (not shown) of the vehicle body roof member 12 between a first position $B_1$ close to the retractor 34 on the roof member 12 and a second position $B_2$ upward and forward of the seat 15 and adjacent to a front upper end of the door structure 16. When the seat belt arrangement is in the occupant-restraining condition which is illustrated by the broken lines in FIG. 2, the belt carrier members 37 and 38 for the lap belt 30 and the shoulder strap 31 are held in the positions $A_1$ and $B_1$, respectively Under these conditions, the lap belt 30 is so positioned that it first extends upwardly and forwardly from the vicinity of the rear inboard lower portion of the door structure 16 in the closed condition, then override the lap or thighs of the occupant of the seat 15 and therefrom extends downwardly and rearwardly toward the bracket 33 fixed to the vehicle body floor member 13. At the same time, the shoulder strap 31 is so positioned that it first extends slightly upwardly from the retractor 34 to the apertured strap carrier member 36 located upward and rearward of the seat 15, then slightly forwardly over the seat 15 or, more specifically, over the shoulder of the seat occupant and thereafter downwardly toward the bracket 33 on the vehicle body floor member 13. When, on the other hand, the seat arrangement is in the unrestraining condition which is illustrated by the full lines in FIG. 2, the belt carrier members 37 and 38 associated with the lap belt 30 and the shoulder strap 31 are held in the positions $A_2$ and $B_2$, respectively. Under these conditions, the lap belt 30 is so positioned that it first extends forwardly alongside of the inner face of the door structure 16 from the retractor 32 mounted on the door structure toward the position $B_2$ which is forward of the seat 15 and then rearwardly and slightly downwardly toward the bracket 33 on the vehicle body floor member 13. At the same time, the shoulder strap 31 is so positioned that it first extends slightly upwardly from the retractor 35 toward the carrier member 36 located over the outboard side end of the seat 15, then forwardly in the fore-and-aft direction of the vehicle along the longitudinal side edge of the vehicle body roof member 12 toward the position $B_2$ located upward and forward of the seat 15 and therefrom downwardly and rearwardly toward the bracket 33 on the vehicle body floor member 12.

The belt carriers 37 and 38 are driven by means of a drive mechanism which is generally designated by reference numeral 39 in FIG. 3 and which is illustrated in detail in FIGS. 4 and 5. Referring concurrently to FIGS. 2 to 5, the drive mechanism D comprises a reversible electric motor 40 which is carried on a stationary member 41 secured to vehicle structural member located forward of the seat and adjacent to the front end of the door structure 16 (FIG. 3). The reversible motor 40 has an output shaft 42 on which a pinion gear 43 and first and second grooved rotary members or pulleys 44 and 45, respectively, are carried. The output shaft 42 of the reversible motor 40 is rotatable in opposite directions which are indicated by $C_1$ and $C_2$ in FIG. 4. The pinion gear 43 is in constant mesh with a sector gear 46 which is pivotally mounted on the stationary member 41 through a pivoal shaft 47. The sector gear 46 is integral with or connected to a swing arm or tubular elongated member 48 which is open at both longitudinal ends. The sector gear 46 and the tubular elongated member 48 are rotatable about the pivotal shaft 47 in clockwise and counterclockwise directions of FIG. 4 between a first angular position $D_1$ extending alongside of an inboard lower portion of the door structure 16 in the closed condition toward the position $A_1$ of the belt carrier member 37 for the lap belt 30 and a second angular position $D_2$ which is generally upright from the pivotal shaft 47. When the tubular elongated member 48 is thus held in the second angular position $C_2$, the leading end of the tubular member 48 is located in the vicinity of the previously mentioned position $A_2$ of the belt carrier member 37 for the lap belt 30.

A first flexible line 49 which may actually be a rope, a wire or a cable is passed throughout the bore in the tubular elongated member 48 and has end portions extending out of the opposite open ends of the tubular elongated member 48 as best seen in FIG. 4. The flexible line 49 is connected at one end to the apertured carrier member 37 for the lap belt 30 and wound at the other end portion of the first grooved pulley 44 rotatable with the output shaft 42 of the reversible motor 40. When, thus, the reversible motor 40 is energized to cause the output shaft 42 and accordingly the pinion 42 and the first grooved pulley 44 to rotate in the direction of arrow $C_1$ so that the tubular elongated member 48 is caused to rotate about the pivotal shaft 47 toward its first angular position $D_1$, then the flexible line 49 is unwound and paid from the grooved pulley 44 and consequently permits the belt carrier member 37 for the lap belt 30 to be moved to the first position $A_1$ thereof. When, on the contrary, the motor 40 is energized to cause the output shaft 42 and accordingly the pinion gear 42 and the first grooved pulley 44 to rotate in the direction of arrow $C_2$ so that the tubular elongated member 48 is caused to rotate about the pivotal shaft 47 toward its second angular position $D_2$, then the flexible line 49 is re-wound on and pulled to the pulley 44 until the belt carrier member 37 for the lap belt 30 reaches its second position $A_2$ at the leading end of the tubular elongated member 48.

The drive mechanism 39 further comprises an endless flexible line 50 which may be a rope, a wire or a cable of a loop form. The endlesss flexible line 50 is passed at one turning end of the second grooved pulley 45 on the output shaft 42 of the reversible motor 40 and extends upwardly and rearwardly for connection to the carrier member 38 for the shoulder strap 31. The endless flexible line 50 may be preferably passed through an interior of a piller such as the front piller 17 so as to be operable in an unobstructed fashion. Designated by reference numeral 51 in FIGS. 4 and 6 is an idler pulley on which the endless flexible line 50 may be passed at its intermediate portions to assure further unobstructed movement of the line.

The endless flexible line 50 is connected to the carrier member 38 for the shoulder strap 31 by means of a drive mechanism which is generally designated by reference numeral 52 in FIG. 3 and which is illustrated in detail in FIGS. 6, 7 and 8. Referring concurrently to FIGS. 6 to 8, the guide mechanism 52 comprises a rail support plate 53 which is rigidly secured to the rigid structural member 35 such as for example the roof side rail of the vehicle body as previously mentioned. The rail support plate 53 carries thereon a guide rail member 54 which extends generally in the fore-and-aft direction of the vehicle along the longitudinal side edge of the vehicle body roof member 12 and above the outboard side end of the seat 15 (FIG. 2). The guide rail member 54 has a rear end located in the vicinity of the first position $B_1$ of the carrier member 38 for the shoulder strap 31 and a front end located in the vicinity of the second position $B_2$ of the carrier member 38 as will be best seen in FIG. 3. A guide roller 55 is in rolling engagement with the guide rail member 54 and is movable between the longitudinal ends of the guide rail member 54, viz., between the first and second positions $B_1$ and $B_2$, respectively, of the carrier member 38 for the shoulder strap 31. The guide roller 55 is integral with or connected to a bracket 56 which, in turn, is rigidly connected through a suitable fastening means such as a bolt 57 to the apertured carrier member 37 by which the shoulder strap 31 is longitudinally movably retained at its intermediate portion as best seen in FIG. 8.

The endless flexible line 51 extending upwardly from the grooved pulley 45 of the drive mechanism 39 has an upper turning end which is passed on a grooved pulley 58 which is mounted on a rearmost end portion of the rail support plate 53 as seen in FIG. 6. Designated by reference numeral 59 is a tensioning roller which is also mounted on the rail support plate 53 for pressing the endless flexible line 50 so as to maintain the tension in the line.

The bracket 56 has first and second opposed projections 56a and 56b which extend in the longitudinal direction of the guide rail member 53. These first and second projections 56a and 56b interconnect the intermediate portion of the endless flexible line 50 extending along the guide rail member 53 through first and second bullet-shaped members 60 and 61, respectively. The first and second bullet-shaped members 60 and 61 are tapered away from the associated brackets 56a and 56b, respectively, of the bracket 56 or toward the positions $B_1$ and $B_2$, respectively, of the carrier member 38 for the shoulder strap 31 as seen in FIG. 6. The carrier member 38 for the shoulder strap 31 is thus movable together with the guide roller 55, the braket 56 and the first and second bullet-shaped tapered members 60 and 61 along the guide rail member 54 between the first and second positions $B_1$ and $B_2$ as the endless flexible line 50 is driven to move along the guide rail member 54 by means of the grooved pulley 45 of the drive mechanism.

On the rail support plate 53 are further mounted first and second limit switches 62 and 63, respectively, which are located at the rear end of the guide rail member 54 and third and fourth limit switches 64 and 65, respectively, which are located at the front end of the guide rail member 54 as seen in FIG. 6. The first and second limit switches 62 and 63 are positioned to provide therebetween an elongated gap 66 and, likewise, is in line with the first bullet-shaped tapered member 60 while the third and fourth limit switches 64 and 65 are positioned to provide there-between an elongated gap 67 which is in line with the second bullet-shaped tapered member 61. The gaps 66 and 67 are so sized as to receive therein the first and second bullet-shaped tapered members 60 and 61, respectively, so that the first and second limit switches 62 and 63 are actuated when the first bullet-shaped tapered member 60 is admitted to the gap 66 between the switches 62 and 63 while the third and fourth limit switches 64 and 65 are actuated when the second bullet-shaped tapered member 61 is admitted to the gap 67 between the switches 64 and 65. The bullet-shaped tapered members 60 and 61 are thus operable as means adapted to actuate the first and second limit switches 62 and 63 or the third or fourth limit switches 64 and 65 depending upon the direction of movement of the carrier member 38 for the shoulder strap 31. The limit switches 62 to 65 above described form part of electric control means provided to control the reversible motor 40 of the previously described drive mechanism (FIGS. 4 and 5). A preferred example of the construction of an electric control circuit to constitute such control means is ilustrated in FIG. 9.

Figure 9:
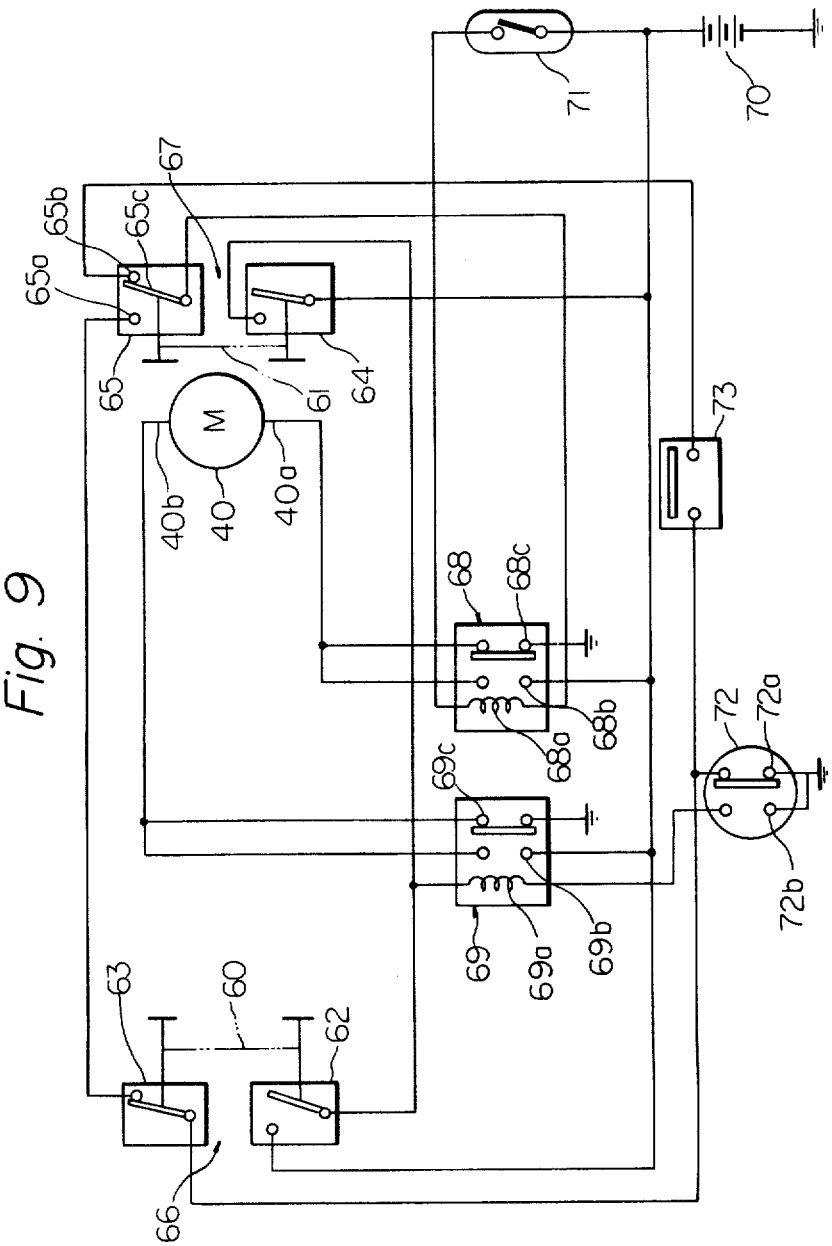
FIG. 9 is a circuit diagram which shows a preferred example of electric control means forming part of the seat belt arrangement embodying the present invention.

Referring to FIG. 9, the limit switches 62 to 65 are illustrated to be arranged in the following manners wherein the first and second bullet-shaped tapered members 60 and 61 shown in FIGS. 6 and 7 are illustrated schematically by actuating linkages 60 and 61: the first limit switch 62 is a single-pole normally open switch which closes when actuated by the first actuating linkage 60; the second limit switch 63 is a single-pole normally closed switch which opens when actuated by the first actuating linkage; the third limit switch 64 is a single-pole normally closed switch which opens when actuated by the second actuating linkage 61; and the fourth limit switch is a double-pole switch having first and second contacts 65a and 65b and a movable contact 65c which is biased to be connected to the first contact 65a and which is connected to the second contact 65b when the switch 65 is actuated by the second actuating linkage 61.

The control circuit further comprises first and second relay switches 68 and 69, respectively. The first relay switch 68 has an exciting coil 68a, a normally open contact 68b to be closed when the exciting coil is energized, and a normally closed contact 68c to open when the coil is energized. Likewise, the second relay switch 69 has an exciting coil 69a, a normally open contact 69b to be closed when the exciting coil 69a is energized, and a normally closed contact 69c to open when the coil 69a is energized. The exciting coil 68a of the first relay switch 68 is connected at one end to a d.c. power source 70 over an ignition switch 71. The d.c. power source 70 may be a usual vehicle-mounted battery which is connected to an ignition system of the vehicle. The ignition switch 71 is adapted to close when the ignition system is energized from the power source 70. The exciting coil 69a of the second relay switch 69 is connected at one end to the power source 70 over a parallel combination of the first and third single-pole limit switches 62 and 64. The normally open contact 68b of the first relay switch 68 is connected on one side to the power source 70 and on the other side to a first terminal 40a of the reversible motor 40 while the normally open contact 69b of the second relay switch 69 is connected between the power source 70 and a second terminal 40b of the reversible motor 40. The d.c. power source is thus connected in parallel to the exciting coil 68a of the first relay switch 68 over the ignition coil 68a of the first relay switch 68 over the ignition switch 70, to the exciting coil 69a of the second relay switch 69 over the parallel combination of the first and third limit switches 62 and 64, and directly to the normally open contacts 68b and 69b of the first and second relay switches 68 and 69, respectively. The normally closed contact 68c of the first relay switch 68 is grounded on one side and connected on the other side to the first terminal 40a of the motor 40 and, likewise, the normally closed contact 69c of the second relay switch 69 is grounded on one side and connected on the other side to the second terminal 40b of the motor 40. The exciting coil 68 a of the first relay switch 68 is connected to the movable contact 65c of the fourth limit switch 65 of the double-pole type.

The control circuit further comprise a door-position responsive switch 72 which has a first contact 72a which closes in response to the closed condition of the door structure 16 (FIG. 2) of the vehicle and a second contact 72b which closes in response to the open condition of the door structure. The first contact 72a of the door-position responsive switch 72 is grounded on one side and connected on the other side to the first stationary contact 65a of the fourth limit switch 65 over the second limit switch 63 of the single-pole type and to the second stationary contact 65b of the fourth limit switch 65 over a seat-position responsive switch 73. The seat-position responsive switch 73 is adapted to close in response to the occupied condition of the seat 15 (FIG. 2) of the vehicle and to open in response to the unoccupied condition of the seat.

The operation of the seat belt arrangement embodying the present invention as has thus far described will now be set forth with concurrent reference to FIGS. 2 to 9.

When the automotive vehicle is maintaned completely, the seat belt arrangement is also held in the inoperative or unrestraining condition so that the respective belt carrier members 37 and 38 retaining the lap belt 30 and te shoulder strap 31 are held in the previously mentioned positions A₂ and B₂, respectively. The second bullet-shaped tapered member 61 connected to the endless flexible line 50 extending along the guide rail member 54 is therefore received in the gap 67 between the third and fourth limit switches 64 and 65, respectively, which are located adjacent to the foremost end of the guide rail member 54 while the first and second limit switches 62 and 63 located adjacent to the rearmost end of the guide rail member 54 remain disengaged from the first bullet-shaped tapered member 60 on the endless flexible line 50. As a consequence, the first limit switch 62 is open, the second limit switch 63 is closed, the third limit switch 64 is open and the fourth limit switch 65 has its movable contact 65c connected to its second stationary contact 65b. The exciting coil 68a of the first relay switch 68 is kept de-energized with the ignition switch 70 open and likewise the exciting coil 69a of the second relay switch 69 kept de-energized with both of the first and third limit switches 62 and 64 open. The normally-open contacts 68b and 69b of the first and second relay switches 68 and 69, respectively, are therefore left open so that the motor 40 of the drive mechanism 39 is held at rest.

When, under these condition, the door structure 16 is opened by an intending vehicle occupant, then the door-position responsive switch 72 is actuated to close its second contact 72b, establishing connection between the exciting coil 69a of the second relay switch 69 and the ground. Since, however, the first and third limit switches 62 and 64 are still kept open, the exciting coil 69a of the first relay switch 69 remains disconnected from the d.c. power source 70 so that the motor 40 is still held at rest. When the seat 15 of the vehicle is then occupied, the seat-position responsive switch 71 closes but, if the door structure 16 is left open, the door-position responsive switch 72 is maintained in the condition closing its second contact 72b so that the exciting coil 68a of the first relay switch 68 is disconnected from the ground although the seat-position responsive switch 71 is closed and the fourth limit switch 65 has its movable contact 65c connected to its second stationary contact 65b connected to the seat-position responsive switch 71. Both, of the exciting coils 68a and 69a of the first and second relay switches 68 and 69, respectively, are thus still kept de-energized to keep the motor 40 inoperative. When, then, the door structure 16 is closed, the door-position responsive switch 72 is caused to close its first contact 72a for establishing the connection between the exciting coil 68a of the first relay switch 68 and the ground but, at this instance, the ignition switch 70 is still kept open, the exciting coil 68a of the first relay switch 68 is disconnected from the power source 70.

When the ignition system is then energized and the ignition switch 70 closes, then a closed loop is built up from the power source 70 to the ground through the ignition switch 70, the exciting coil 68a of the first relay switch 68, the second stationary contact 65b of the fourth limit switch 65, the seat-position responsive switch 71, and the first contact 72a of the door-position responsive switch 72. The exciting relay 68a of the first relay switch 68 is thus energized from the power source 70 so that the normally open contact 68b of the relay switch 68 closed. A closed loop is consequently established by the power source 70, the contact 68b of the first relay switch 68, the terminals 40a and 40b of the motor 40, the normally closed contact 69c of the second relay switch 69 (the exciting coil 69a of which is kept de-energized with the first and third limit switches 62 and 64 kept open) and the ground.

The motor 40 is now actuate to rotate its output shaft 42 and accordinly the first and second grooved pulleys 44 and 45 in the direction of arrow C₁ indicated in FIG. 4 so that the tubular elongated member 48 is driven through the pinion gear 43 and the sector gear 46 to rotate about the pivotal shaft 47 clockwise of FIG. 4 from its second angular position D₂ to its first angular position D₁ which is close to the lower end of the door structure 16. As the tubular elongated member 48 is rotated toward the first angular position D₁ thereof, the flexible line 49 on the first grooved pulley 45 is unwound and paid therefrom with the result that the belt carrier member 37 fastened to the leading end of the flexible line 49 is pulled from its second position A₂ to its first position A₁ close to the rear inboard lower portion of the door structure 16 in the closed condition as the lap belt 30 is contracted by means of the locking retractor 32 on the inner wall member of the door structure 16. As the belt carrier member 37 for the lap belt 30 is in this manner being moved from its second position A₂ to its first position A₁, the endless flexible line 50 is driven by the second grooved pulley 45 on the output shaft 42 of the motor 40 so that the bracket 56 which carries the guide roller 55 and the carrier member 38 for the shoulder strap 31 is moved along the guide rail member 54 from its second position B₂ close to the foremost end of the guide rail member 54 toward its first position B₁ close to the rearmost end of the guide rail member 54. The second bullet-shaped tapered member 61 connected to the endless flexible line 50 is moved out of the gap 67 between the third and fourth limit switches 64 and 65 on the rail support member 53 with the result that the third limit switch 64 is allowed to close and simultaneously the fourth limit switch 65 is allowed to have its movable contact 65c connected to the first stationary contact 65a. Under these conditions, a closed loop is made up by the power source 70, the ignition switch 70, the exciting coil 68a of the first relay switch 68, the first stationary contact 65a of the fourth limit switch 65, the second normally closed limit switch 63, the first contact 72a of the door-position responsive switch 72 and the ground. The first relay switch 68 therefore remains in the condition to have its normally open contact 68b closed and accordingly the closed loop built up between the power source 70 and the ground through the normally open contact 68b of the first relay switch 68, the first and second terminals 40a and 40b of the motor 40, and the normally closed contact 69c of the second relay switch 69 is maintained. The motor 40 is therefore kept energized from the power source 70 so that the carrier member 38 for the shoulder strap 31 is kept driven by the endless flexible line 50 to move toward its first position B₁ which is close to the rearmost end of the guide rail member 54. When the exciting coil 68a of the first relay switch 58 is thus energized from the power source 70, the exciting coil 69a of the second relay switch 69 is also connected to the power source 70 through the third limit switch 64 which is in the closed condition but will not be energized because the door-position responsive switch 72 is in the condition to disconnect the exciting coil 69a from the ground. It may be noted in this instance that the exciting coil 68a of the first relay switch 68 bypasses the seat-position responsive switch 71 and is thus kept energized from the power source 70 irrespective of the open or closed condition of the seat-position responsive switch 71 when the second limit switch 63 is closed, viz., when the carrier member 38 retaining the shoulder strap 31 is being moved from its second position B₂ toward its first position B₁.

When the carrier member 38 for the shoulder strap 31 then reaches its first position B₁ close to the rearmost end of the guide rail member 54, the first bullet-shaped tapered member 60 is received in the gap 66 between the first and second limit switches 62 and 63 on the rail support plate 53. The first limit switch 62 now closes and simultaneously the second limit switch 63 opens. The second limit switch 63 thus being made open, the fourth limit switch 65 which remains in the condition to have its movable contact 65c connected to the second stationary contact 65b thereof is disconnected from the ground so that the exciting coil 68a of the second relay switch 68 becomed de-energized. Although, moreover, the first and third limit switches 62 and 64 are in the closed conditions, the exciting coil 69a of the second relay switch 69 also remains deenergized because of the fact that the door-position responsive switch 72 is maintained in the condition in which the second contact 72 thereof is open responsive to the closed condition of the door structure 16. As a consequence, the motor 40 is brought to a stop and, when the motor is thus stopped, the tubular elongated member 48 of the drive mechanism 39 is moved to its first angular position $D_1$ extending along and adjacent to the lower inboard end of the door structure 15. Under these conditions, the belt carrier members 37 and 38 retaining the lap belt 30 and the shoulder strap 31, respectively, are held in their respective first positions $A_1$ and $B_1$ so that the lap belt 30 and the shoulder strap 31 are maintained in their respective occupant-restraining positions which are indicated by broken lines in FIG. 2.

It will now be understood from the foregoing description that the seat belt arrangement embodying the present invention is actuated into the occupant-restraining condition when three different operative conditions of the automotive vehicle are satisfied including the occupied condition of the seat, the closed condition of the door structure and the energized condition of the ignition system. When the seat belt arrangement is held in the occupant-restraining condition, the shoulder belt extends downwardly from, for example, the roof side rail of the vehicle body structure and furthermore the flexible line connected to the lap belt extends along and adjacent the lower end of the door structure, the occupant of the vehicle is not impeded in viewing to the rear of the vehicle and in manipulating the functional parts on the inner wall member of the door structure.

Description will now be made as to the motions of the seat belt arrangement shown in FIGS. 2 to 9 during a condition in which the vehicle occupant who has been restrained by the seat belt arrangement is leaving the vehicle. At an initial stage of such a condition, the switches 62 to 65 and 70 to 72 are held in conditions in which the first limit switch 62 is open, the second limit switch 63 is closed, the third limit switch 64 is open, the fourth limit switch 65 has its movable contact 65c connected to the first stationary contact 65a, the ignition switch 71 is closed, the seat-position responsive switch 71 is closed and the door position responsive switch 72 has its first contact 72a closed.

When the door structure 16 is closed under these conditions, then the door-position responsive switch 72 is actuated to close it second contact 72b so that the exciting coil 69a of the second relay switch 69 is connected at one end to the power source 70 through the parallel combination of the first and third limit switches 62 and 64 and grounded at the other end through the second contact 72b of the door-position responsive switch 72. The normally-open contact 69b of the second relay switch 69 is therefore closed. The exciting coil 68a of the first relay switch 68, on the other hand, remains de-enegized with the second limit switch 63 kept open and with the fourth limit switch 65 held in the condition having the movable contact 65c connected to the first stationary contact 65a which is associated with the second limit switch 63, so that the normally closed contact 68c of the second relay switch 68 is left closed. A closed loop is therefore built up by the power source 70, the normally open contact 69b of the second relay switch 69, the second and first terminals 40b and 40a, respectively, of the motor 40, the normally closed contact 68c of the first relay switch 68 and the ground.

The motor 40 is now actuated to rotate its output shaft 42 and accordingly the first and second grooved pulleys 44 and 45 in the direction of arrow $C_2$ indicated in FIG. 4 so that the tubular elonated member 48 is driven through the pinion gear 43 and the sector gear 46 to rotate about the pivotal shaft 47 counterclockwise of FIG. 4 from its first angular position $D_1$ toward its second angular position $D_2$ which is generally upright from the pivotal shaft 47. As the tubular elongated member 48 is thus rotated toward the second angular position $D_2$ thereof, the flexible line 49 extending alongside of the inner face of the door structure 16 is wound on the first grooved pulley 44 and pulled away from the lower outboard end portion of the seat 15 so that the belt carrier member 37 fastened to the leading end of the flexible line 49 is moved away from its first position $A_1$ toward its second position $A_2$, permitting the lap belt 30 to be extended from the locking retractor 32 on the door structure 16 toward its unrestraining position. As the belt carrier 37 for the lap belt 30 is in this manner being moved from its first position $A_1$ toward its second position $A_2$, the endless flexible line 50 is driven by the second grooved pulley 45 on the output shaft 42 of the motor 40 so that the bracket 56 which carries the guide roller 55 and the carrier member 38 for the shoulder strap 31 is moved along the guide rail member 54 from its first position $B_1$ toward its second position $B_2$ which is close to the foremost end of the guide rail member 54. As a consequence, the first bullet-shaped tapered member 60 connected to the endless flexible line 50 is moved out of the gap 66 between the first and second limit switches 62 and 63 on the rail support plate 53 with the result that the first limit switch 62 is allowed to open and simultaneously the second limit switch 63 is allowed to close. Although the first lilmit switch 62 is thus made open and the second lilmit switch 63 made closed, the exiciting coil 69a of the second relay switch 69 remains energized from the power source 70 and the exciting coil 68a of the first relay switch 68 remains de-energized because the closed loop between the power source 70 and the ground through the exciting coil 69a is still maintained by the closed third limit switch 64 and the exciting coil 68a is isolated from the ground with the second limit switch 63 in the closed condition. It therefore follows that the second relay switch 69 has its normally open contact 69b closed and the first relay switch 68 has its normally-open contact 68b left open. The motor 40 is in this manner still kept energized from the power source 70 through the normally open contact 69b of the second relay switch 69, thereby continueing to drive the bracket 56 and accordingly the carrier member 38 retaining the shoulder strap 31 to move on the guide rail member 54 toward the second position $B_2$ of the carrier member 38. As the carrier member 38 is thus moved forwardly of the seat 15, that portion of the shoulder strap 31 which has been bearing against the chest of the occupant of the seat 15 is also moved forwardly. When the carrier member 38 for the shoulder strap 31 reaches its second position $B_2$ adjacent to the foremost end of the guide rail member 54, the second bullet-shaped tapered member 61 is admitted to the gap 67 between the third and fourth limit switches 64 and 65. The third limit switch 64 is accordingly caused to open and at the same time the fourth limit switch 65 is caused to have its movable contact 65c connected to the second stationary contact 65b. As a consequence, the exciting coil 69a of the second relay switch 69 is disconnected from the power source 70 with both of the first and third limit switches 62 and 64 kept open and the exciting coil 68a of the first relay switch 68 remains de-energized because of the fact that the door-position responsive switch 72 is held in the condition in which the first contact 72a thereof is open in response to the open condition of the door structure 15. The motor 40 is therefore de-energized from the power source 70 and is accordingly brought to a standstill.

When the motor 40 is thus stopped, the tubular elongated member 48 is held in its second angular position $D_2$ which is generally upright from the pivotal shaft 47 and, at the same time, the belt carrier member 37 for the lap belt 30 is located at its second position $A_2$ atop the leading end of the tubular elongated member 48, while the carrier member 38 retaining the shoulder strap 31 is located at its second position $B_2$ adjacent to the foremost end of the guide rail member 54. Both the lap belt 30 and the shoulder strap 31 are in this manner held in the respective unrestraining positions thereof as indicated by the full lines in FIG. 2.

From the above description it will be understood that the seat belt arrangement embodying the present invention can be shifted from the occupant-restraining condition to the unrestraining condition simply in response to the opening movement of the door structure and irrespective of the occupied or unoccupied condition of the seat and the energized or de-energized condition of the ignition system. This is because of the fact that the exciting coil 69a of the second relay switch 69 is predominant over the operation of the reversible motor 40 to drive the belt carrier members 37 and 38 into their respective second positions $A_2$ and $B_2$ is energized and de-energized irrespective of the open or closed conditions of the ignition switch 71 and the seat-position responsive switch 73. The unrestraining conditions of the lap belt 30 and the shoulder strap 31 are maintained even after the occupant of the vehicle has cut off the ignition system, unseated from the seat 15, and/or closed the door structure 16 because the exciting coil 68a of the first relay switch 68 can not be energized and accordingly the motor 40 can not be restarted unless all of the ignition switch 71, the door-position responsive switch 72 and the seat-position responsive switch 73 are concurrently in the closed conditions. If, furthermore, the ignition system is de-energized with the door structure kept open and then the door structure is closed, then the occupant of the vehicle may be permitted to stay on the seat 15 without being unrestrained by the seat belt arrangment.

Figure 10:
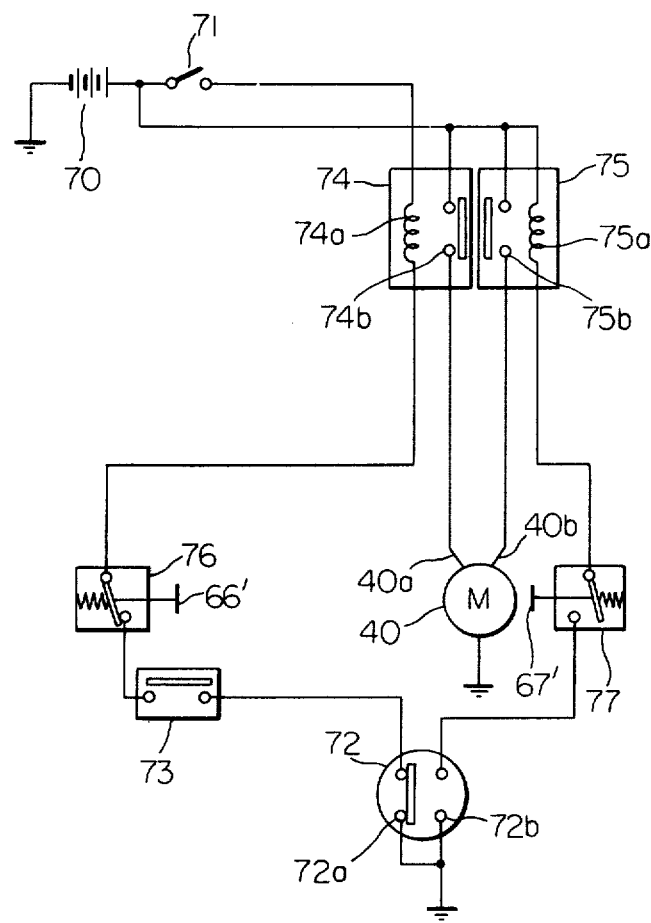
FIG. 10 is a circuit diagram which shows another preferred example of the electric control means incorporated into the seat belt arrangement embodying the present invention.

FIG. 10 illustrates another preferred example of the electric control circuit to actuate the reversible motor 40 in either direction depending upon the predetermined operative or inoperative conditions of the automotive vehicle. Referring to FIG. 10, the control circuit is also adapted to operate depending upon the energized or de-energized condition of the ignition system, the closed or open condition of the door structure and the occupied or unoccupied condition of the seat and thus comprises an ignition switch 71 associated with the d.c. power source 70 for the ignition system, a door-position responsive switch 72 and a seat-position responsive switch 73. Similarly to those incorporated in the control circuit described with reference to FIg. 9, the ignition switch 71 is adapted to close when the ignition system is energized, the door-position responsive switch 72 is adapted to have its first contact 72a closed responsive to the closed condition of the door structure and its second contact 72b closed responsive to the open condition of the door structure, and the seat-position responsive switch 73 is adapted to be closed responsive to the occupied condition of the seat.

The control circuit shown in FIG. 10 further comprises first and second relay switches 74 and 75, respectively. The first relay switch 74 has an exciting coil 74a and a normally open contact 74b to be closed when the exciting coil 74a is energized. Likewise, the second relay switch 75 has an exciting coil 75a and a normally open contact 75b to be closed when the exciting coil 75a is energized. The exciting coil 74a of the first relay switch 74 is connected at one end to the positive terminal of the power source 70 over the ignition switch 71 and at the other end to a first limit switch 76 and, likewise, the exciting coil 75a of the second relay switch 75 is connected to the positive terminal of the power source 70 and at the other end to a second limit switch 77. The power source 70 is further connected in parallel to first and second terminals 40a and 40b of the motor 40 over the normally open contacts 74b and 75b of the first and second relay switches 74 and 75, respectively.

The first and second limit switches 76 and 77 are associated with actuating linkages 66' and 67', respectively. These actuating linkages 66' and 67' are responsive to the movements of the previously described first and second bullet-shaped or, in this instance, otherwise configured tapered members 60 and 61 of the guide mechanism 52 illustrated in FIG. 6. Thus, the first and second limit switches 76 and 77 of the control circuit shown in FIG. 10 are respectively alternatives of the combinations of the first and second limit switches 62 and 63 and the third and fourth limit switches 64 and 65 of the control circuit shown in FIG. 9. The first limit switch 76 is biased to open and is caused to close when actuated by the first bullet-shaped tapered member 60 through the actuating linkage 66' and, likewise, the second limit switch 77 is biased to open and is caused to close when actuated by the second bullet-shaped tapered member 61 through the actuating linkage 67'. The first limit switch 76 is connected on one side to the exciting coil 74a of the first relay switch 74 and on the other side to the ground over a serial combination of the seat-position responsive switch 73 and the first contact 72 a of the door-position responsive swtich 72. The second limit switch 77 is, on the other hand, connected on one side to the exciting coil 75a of the second relay switch 75 and on the other side to the ground over the second contact 72b of the door-position responsive switch 72. The d.c. power source 70 is grounded at its negative terminal.

The operation of the electric control circuit above described will now be explained with concurrent reference to FIGS. 2 to 8 and 10.

When the automotive vehicle is maintained at rest, the seat belt arrangement is also held in its inoperative or unrestrained condition with the lap belt 30 and the shoulder strap 31 positioned as indicated by the full lines in FIG. 2. The carrier member 38 retained the shoulder strap 31 is accordingly located at the foremost end of the guide rail member 54 so that the second bullet-shaped tapered member 61 connected to the endless flexible line 50 extending along the guide rail member 54 is held in engagement with the actuating linkage 67' of the second limit switch 77. The second limit switch 77 is thus maintained open while the first limit switch 76 is kept closed with the first bullet-shaped tapered member 60 held disengaged from the actuating linkage 66' of the first limit switch 76. If, under these conditions, the door structure 16 of the vehicle is closed, the door-position responsive switch 72 is held in a condition having its first contact 72a closed and its second contact 72b open. Even though the first limit switch 76 and the first contact 72a of the door-position responsive switch 72 are thus kept closed, the exciting coil 74a of the first relay switch 74 remains de-energized because the ignition switch 71 and the seat-position responsive switch 73 are open. The exciting coil 75a of the second relay switch 75 is also kept de-energized because both the second limit switch 77 and the second contact 72b of the door-position responsive switch 72 are open.

When, then, an intending vehicle occupant opens the door structure 16 of the vehicle, the first contact 72a of the door-position responsive switch 72 becomes open and instead the second contact 72b of the switch 72 closes. Since, however, the second limit switch 77 is kept closed with the associated bullet-shaped tapered member 61 maintained engaged with the actuating linkage 67' of the second limit switch 77. The motor 40 is therefore still maintained at a standstill.

When the vehicle occupant entering the vehicle is seated on the seat 15, closes the door structure 16 and energizes the ignition system of the vehicle, then the seat-position responsive switch 73, the first contact 72a of the door-position responsive switch 72 and the ignition switch 71 becomes closed in this sequence. A closed loop is consequently built up by the power source 70, the ignition switch 71, the exciting coil 74a of the first relay switch 74, the first limit switch 76, the seat-position responsive switch 73, the first contact 72a of the door-position responsive switch 72, and the ground with the result that the exciting coil 74a of the first relay switch 74 becomes energized from the d.c. power source 70, causing the contact 74b of the first relay switch 74 to close. The reversible motor 40 is thus connected at its first terminal 40a to the power source 70 so that the output shaft 42 and accordingly the pinion gear 43 and the first and second grooved pulleys 44 and 45 are driven to rotate the direction of arrow $C_1$ indicated in FIG. 3. The tubular elongated member 48 is now driven to rotate about the pivotal shaft 47 from its second angular position $D_2$ toward its first angular position $D_1$ while the flexible line 49 is unwound and pair from the first grooved pulley 44 so that the belt carrier member 37 fastened to the leading end of the flexible line 49 is pulled by the lap belt 30 and moved away from its second position $A_2$ toward its first position $A_1$ which is close to the rear inboard lower portion of the door structure 16. As the belt carrier member 37 is being moved in this manner, the endless flexible line 50 is driven by the second grooved pulley 45 so as to move the carrier member 38 for the shoulder strap 31 to move away from its second position $B_2$ close to the foremost end of the guide rail member 54 toward its first position $B_1$ close to the rearmost end of the guide rail member 54. The second bullet-shaped tapered member 61 on the endless flexible line 50 is consequently moved out of engagement with the actuating linkage 67' for the second limit switch 77, which is accordingly allowed to restore its normal closed condition. Since, however, the door-position responsive switch 72 is maintained in the condition having its first contact 72a closed and its second contact 72b open, the exciting coil 74a of the first relay 74 remains energized from the power source 70 and the exciting coil 75a of the second relay switch 75 remains de-energized. The motor 40 is thus maintained operative to drive the belt carrier members 37 and 38 for the lap belt 30 and the shoulder strap 31 from their respective second positions $A_2$ and $B_2$ toward their respective first positions $A_1$ and $B_1$.

When the carrier member 38 retaining the shoulder strap 31 reaches the rearmost end of the guide rail member 54, then the first bullet-shaped tapered member 60 is brought into engagement with the actuating linkage 66' of the first limit switch 76. The first limit switch 76 is consequently made open so that the exciting coil 74a of the first relay switch 74 is de-energized and accordingly the normally open contact 74b of the relay switch is allowed to become open. The motor 40 is therefore brought to a stop because both of the normally open contacts 74b and 75b of the first and second relay switches 74 and 75 are kept open. Under these conditions, the tubular elongated member 48 is held in its first angular position $D_1$ extending along the lower end portion of the door structuure while the belt carrier members 37 and 38 for the lap belt 30 and the shoulder strap 31 are located at their respective first positions $A_1$ and $B_1$. The lap belt 30 and the shoulder strap 31 are accordingly held in their respective occupant-restraining positions as indicated by the broken lines in FIG. 2.

When the vehicle occupant is leaving the vehicle and thus opens the door structure 15, then the door-position responsive switch 72 is actuated so as to open its first contact 72a and to close its second contact 72b. A closed loop is therefore built up by the power source 70, the exciting coil 75a of the second relay switch 75, the second limit switch 77, the second contact 72b of the door-position responsive switch 72 and the ground. The exciting coil 75a of the second relay switch 75 is consequently energized from the power source 70 so that the contact 75b of the relay swtich 75 is caused to close, whereby the motor 40 is connected at its second terminal 40b to the power source 70. The motor 40 is thus actuated to drive the pinion gear 43 and the first and second grooved pulleys 44 and 45 to rotate in the directions of arrow $C_2$ indicated in FIG. 3 with the result that the tubular elongated member 48 is caused to rotate about the pivotal shaft 47 from its first angular position $D_1$ toward its second angular position $D_2$ and at the same time the flexible line 49 is pulled toward the first grooved pulley 44 so as to move the belt carrier member 37 for the lap belt 30 to be moved from its first position $A_1$ to its second position $A_2$. As the belt carrier member 37 for the lap member 30 is moved in this manner, the carrier member 38 retaining the shoulder strap 31 is driven by the second grooved pulley 45 and the endless flexible line 50 and is moved away from its first position $B_1$ closed to the rearmost end of the guide rail member 54 toward its second position $B_2$ close to the foremost end of the guide rail member 54. As the carrier member 38 for the shoulder strap 31 is thus moved away from its first position $B_1$, the first bullet-shaped tapered member 60 connected to the endless flexible line 50 is disengaged from the actuating linkage 66' of the first limit switch 76. The first limit switch 65 is therefore allowed to restore its normal closed condition but, since the door-position responsive switch 72 is maintained in the condition having its first contact 72a open, the exciting coil 74a of the first relay switch 74 remains energized and accordingly the normally-open contact 74b of the relay switch 74 remains open. The motor 40 is thus kept operative to move the belt carrier members 37 and 38 toward their respective second positions $A_2$ and $B_2$ because the second limit switch 77 and the second contact 72b of the door-position responsive switch 72 are in the closed conditions.

When the carrier member 38 retaining the shoulder strap 31 reaches its second position $B_2$ located at the foremost end of the guide rail member 54, then the second bullet-shaped tapered member 61 is brought into engagment with the actuating linkage 67' of the second limit switch 77. The second limit switch 77 is therefore made upon so as to render the exciting coil 75a of the second relay switch 75 de-energized. The normally open contact 75b of the second relay switch 75 is accordingly made open so that the motor 40 is disconnected from the power source 70. The motor 40 is now brought to a stop with the lap belt 30 and the shoulder strap 31 held in their respective unrestraining conditions.

The control circuit shown in FIG. 10 is thus adapted to move the lap belt and the shoulder strap into the occupant-restraining conditions in response concurrently to the closed condition of the door structure, the occupied condition of the seat and the energized condition of the ignition system and into the unrestraining conditions in response to the open condition along of the door structure.

From the foregoing description it will now be appreciated that the passive seat belt arrangement according to the present invention is advantageous over the prior art versions of the arrangement in the following respects:-

1. The shoulder strap 31 is fastened at its upper end not to the central portion of the vehicle body roof member 12 but to the rigid member of the body side structure such as for example the roof side rail or the piller, the shoulder strap can be supported securely at its upper end even when the strap is pulled violently by an impact imparted to the vehicle occupant in the event of a sudden stop, a rapid deceleration or a collision of the automotive vehicle. The seat belt arrangement is thus operable to reliable protect the vehicle occupant in the event of such an accident.

2. When the seat belt arrangement is in the occupant-restraining condition, the shoulder strap 31 extends from the body side structural member of the vehicle to the vehicle occupant's shoulder, the occupant, expecially the driver, of the vehicle is not impended in viewing to the rear of the vehicle through the occupant compartment. This will contribute to assurance of safety in the driving of the vehicle.

3. When the seat belt arrangement is in the occupant-restraining condition, moreover, the flexible line 49 extends along the inboard lowermost portion of the door structure 15 which is in the closed condition and thus creates no obstacle to the occupant's access to the various functional parts mounted on the inner face of the door structure.

4. The lap belt 30 and the shoulder strap 31 can be moved reliably between their respective occupant-restraining and unrestraining positions because the belt carrier members 37 and 38 retaining them are positively driven by means of the drive mechanism 39.

5. During the inoperative or unrestraining condition of the seat belt arrangement, both of the lap belt 30 and the shoulder strap 31 have their respective intermediate portions located ahead of the seat and will thus permit the vehicle occupant to smoothly enter or leave the vehicle cabin without being interferred with by the belt and strap.

6. The seat belt arrangement is actuated into the occupant-restraining condition when, and only when, those conditionss are established in which the door is closed, the seat occupied and the ignition system energized. The seat belt arrangement can therefore be held in the occupant-restraining position only when the vehicle occupant should be protected from an unforeseen injury, different from the prior art passive type seat belt arrangements which are actuated into the protective conditions merely in response to the opening movements of the doors.

7. The seat belt arrangement can be actuated into the unrestraining condition simply in response to the open condition of the door, viz., withhout respect to the occupied or unoccupied condition of the seat and the energized or de-energized condition of the ignition system, so that the vehicle occupant can be readily released from the seat belt arrangement when leaving the vehicle temporarily.

8. When the vehicle is at a standstill, the occupant of the vehicle is permitted to stay on the seat without being restrained by the seat belt arrangement irrespective of the open or closed condition of the door provided the ignition system is de-energized. The seat belt arrangement can thus be readily actuated into the occupant-restraining condition directly from the unrestraining condition when the previously mentioned three conditions are concurrently established, in contrast to the prior art passive type seat belt arrangement which are maintained in the occupant-restraining condition even in the absence of an occupant of the vehicle and which should be returned to the unrestraining condition before it is actuated into the actually restrained condition.

9. Only a limited amount of frictional force is produced in the guide mechanism 52, especially between the guide rail member 54 and the guide roller 55 so that not only a wide variety of selection is open to the materials and configurations of the transmission means to interconnect the driving source and the carrier member 38 for the shoulder strap 31 but the driving source may be of a limited capacity and accordingly of a relatively small size.

What is claimed is:

1. A passive seat belt arrangement for an automotive vehicle, comprising a first flexible elongated member which is connected at one end to a rear inboard lower portion of a door structure adjacent to an outboard side end of a seat of the vehicle and which is connected at the other end to a vehicle body floor member located substantially below an inboard side end of the seat, a second flexible elongated member which is connected at one end to a rigid vehicle body structural member adjacent to a side edge of a vehicle body roof member and located upwardly and rearwardly of the seat and which is connected at the other end to the vehicle body floor member below the inboard side end of the seat, each of the first and second flexible elongated members being movable between an occupant-restraining position to restrain an occupant of the seat and an unrestraining position to permit the occupant to be released therefrom, first and second releasable biasing and locking means for biasing the first and second flexible elongated members, respectively, to their occupant-restraining positions and holding the flexible elongaged member locked when the members are taut in their respective occupant-restraining positions, a first carrier member which is movable in a predetermined path substantially in a fore-and-aft direction of the vehicle and alongside of a lower inboard portion of the door structure between a first position close to the end of the first flexible elongated member fixed to the door structure and a second position forward of the seat and by which the first flexible member is longitudinally movably received at its intermediate portion, the first flexible elongated member being moved to the occupant-restraining position thereof when said first carrier member is moved to the first position thereof and to the unrestraining position when the first carrier member is moved to the second position thereof, a second carrier member which is movable in a predetermined path substantially in a fore-and aft direction of the vehicle along and inboardly of said side edge of the vehicle roof member between a first position close to the end of the second flexible elongated member fixed to the said rigid vehicle body structural member and a second position forward and upward of the seat and by which the second flexible elongated member is longitudinally movably received at its intermediate portion which is accordingly movable between the first and second position of the second carrier member, the second flexible elongated member being moved to the occupant-restraining position thereof when the second carrier member is moved to the first position thereof and to the unrestraining position when the second carrier member is moved to the second position thereof, guide means for guiding said second carrier member along said predetermined path between the first and second positions thereof, drive means for driving the first and second carrier members so as to concurrently move between the respective first and second positions thereof, said drive means comprising a driving source which has an output shaft rotatable in first and second directions and which is energized by said control means so as to cause the output shaft to rotate in the first or second direction when the control means respond to said predetermined operative or inoperative conditions, respectively, or the vehicle, first and second rotary members which are rotatable with the output shaft of the driving source, a tubular elongated member which is mounted through a pivot on a stationary member of the vehicle body structure located in the vicinity of the second position of the first carrier member and which is rotatable between a first angular position extending substantially horizontally toward the first position of the first carrier and a second angular position which is substantially upright from said pivot so as to have its upper end located in the vicinity of the second position of the first carrier member, power transmission means interconnecting the output shaft of the driving source and the tubular elongated member for moving the tubular elongated member to the first or second angular position thereof when the driving source is actuated by the control means for causing the output shaft to rotate in the first or second direction, respectively, a first flexible line which is longitudinally movably passed throughout the tubular elongated member and which is connected at one end to the first carrier member and at the other end to the first rotary member, the first flexible line having a first condition extended from the first rotary member and terminating at said one end thereof in the vicinity of the first position of the first carrier member and a second condition shortened toward the first rotary member, the first flexible line being driven by said driving source through the first rotary member into the first condition thereof to allow the first carrier member to move to its first position when the output shaft of the driving source is rotated in the first direction thereof and into the second condition to move the first carrier member to the second position thereof when the output shaft of the driving source is rotated in the second direction thereof, and a second flexible line which is connected between the second carrier member and the second rotary member and movable in a first direction to move the second carrier member to the first position thereof and a second direction to move the second carrier member to the second position thereof, the second flexible line being driven from the driving source through the second rotary member in the first or second direction thereof when the output shaft of the driving source is rotated in the first or second direction, respectively, thereof, and electric control means responsive to predetermined operative and inoperative conditions of the vehicle for causing the drive means to drive the first and second carrier members to the respective first positions thereof in response to the predetermined operative conditions of the vehicle and to the second positions thereof in response to the predetermined inoperative conditions of the vehicle.

2. A passive seat belt arrangement as claimed in claim 1, in which said guide means comprise a guide rail which is fixedly mounted on a rigid vehicle body structural member adjacent to said side edge of the vehicle body roof member and which longitudinally extends substantially in the fore-and-aft direction of the vehicle along said predetermined path of the second carrier member, the guide rail having a rear end located in the vicinity of the first position of the second carrier member and a front end located in the vicinity of the second position of the second carrier member, and a guide roller which is movable on the guide rail between the rear and front ends of the rail and which is rigidly connected to the second carrier member, said guide roller being connected to said second flexible line for being moved from said second position to said first position of the second carrier member as the second flexible line is moved in said first direction thereof and from said first position to said second position of the second carrier member as the second flexible line is moved in said second direction thereof.

3. A passive seat belt arrangement as claimed in claim 1, in which said control means comprise first switch means responsive to an energized or de-energized condition of an ignition system of the vehicle, second switch means responsive to an occupied or unoccupied condition of the seat, and third switch means responsive to a closed or open condition of the door structure adjacent the seat, said control means being operative to control the drive means for moving the first and second carrier members to move to the respective first positions thereof in response concurrently to the energized condition of the ignition system, the occupied condition of the seat and the closed condition of the door structure and to the respective second position thereof in response to at least one of the de-energized condition of the ignition system, the unoccupied condition of the seat and the open condition of the door structure.

4. A passive seat belt arrangement as claimed in claim 1, wherein said guide means comprise a guide rail which is fixedly mounted on a rigid vehicle body structural member adjacent to said side edge of the vehicle body roof and which longitudinally extends substantially in the fore-and-aft direction of the vehicle along said predetermined path of the second carrier member, the guide rail having a rear end located in the vicinity of the first position of the second carrier member and a front end located in the vicinity of the second position of the second carrier member, and a guide roller which is movable on the guide rail between the rear and front ends of the rail and which is rigidly connected to the second carrier member, said guide roller being connected to said second flexible line for being moved from said second position to said first position of the second carrier member as the second flexible line is moved in said first direction thereof and from said first position to said second position of the second carrier member as the second flexible line is moved in said second direction thereof, and wherein said control means comprise first switch means responsive to an energized or de-energized condition of an ignition system of the vehicle, second switch means responsive to an occupied or unoccupied condition of the seat equipped with the seat belt arrangement, and third switch means responsive to a closed or open condition of the door structure adjacent the seat, said control means being operative to control the drive means for moving the first and second carrier member to move to the respective first positions thereof in response concurrently to the energized condition of the ignition system, the occupied condition of the seat and the closed condition of the door structure and to the respective second positions thereof in response to at least one of the de-energized condition of the ignition system, the unoccupied condition of the seat and the open condition of the door structure.

5. A passive seat belt arrangement as claimed in claim 1, in which said control means comprise first switch means responsive to an energized or de-energized condition of the ignition system of the vehicle, second switch means responsive to an occupied or unoccupied condition of the seat equipped with the seat belt arrangement, third switch means responsive to a closed or open condition of the door structure adjacent to the seat, fourth switch means responsive to an arrival of said second carrier member at the first position thereof, fifth switch means responsive to an arrival of the second carrier member at the second position thereof, sixth switch means for actuating said drive means to drive said first and second carrier members to move to their respective first positions, seventh switch means for actuating the drive means to drive the first and second carrier members to their respective second positions, and a power source for energizing said drive means when the drive means are actuated by said sixth or seventh switch means, wherein said sixth switch means become operative to actuate the drive means when said first, second, third and fourth switch means are concurrently responsive to the energized condition of the ignition system, the occupied condition of the seat, the closed condition of the door structure and the arrival of said carrier member at the second position thereof, respectively, and said seventh switch means become operative to actuate said drive means when said third and fifth switch means are concurrently responsive to the open condition of the door structure and the arrival of said second carrier member at the first position thereof, respectively.

6. A passive seat belt arrangement as claimed in claim 5, in which said fourth switch means comprise first and second single-pole limit switches which are normally open and closed, respectively, and said fifth switch means comprise a third normally closed single-pole limit switch and fourth double-pole limit switch having first and second stationary contacts and a movable contact which is normally connected to said second stationary contact, said first and second limit switches beng actuated to close and open, respectively, in response to the arrival of said second carrier member at the first position thereof, said third limit switch being actuated to open in response to the arrival of the second carrier member at the second position thereof, and said fourth limit switch being actuated to have its movable contact connected to said first stationary contact, said second and fourth limit switches being connected in parallel between said third and sixth switch means so that the sixth switch means are made operative to acutate said drive means when said second limit switch is open and concurrently said fourth limit switch has its movable contact connected to its second stationary contact, and said first and third limit switches being connected in parallel between said third and seventh means so that the seventh switch means are made operative to actuate said drive means when said first limit switch is closed and concurrently said third limit switch is open.

7. A passive seat belt arrangement as claimed in claim 6, in which said sixth switch means comprise a coil connected to said power source over said first, second and third switch means and the second stationary contact of said fourth limit switch, a normally open contact connected between said power source and said drive means and closed when said coil is energized from said power source and a normally closed contact connected between said drive means and ground and opened when said coil is energized, and said seventh switch means comprise a coil connected to said power source over said third switch means and a parallel combination of said first and third limit switches, a normally open contact connected between said power source and said drive means and closed when the coil of the seventh switch means is energized from the power source and a normally closed contact connected between said drive means and the ground and opened when the coil of the seventh means is energized from the power source, said coil of the sixth switch means being energized when said first, second and third switch means are responsive to the energized condition of the ignition system, the occupied condition of the seat and the closed condition of the door structure and said second limit switch is responsive to the arrival of said second carrier member at the second position thereof, said coil of the seventh switch means being energized when said third switch means is responsive to the open condition of the door structure and said third limit switch is responsive to the arrival of said second carrier member at the first position thereof.

8. A passive seat belt arrangement as claimed in claim 5, in which said fourth switch means comprise a normally closed limit switch which is connected to said power source over said first, second, third and sixth switch means and which is actuated to open in response to the arrival of said second carrier member at the second position thereof, and said fifth switch means comprise a normally closed limit switch which is connected to said power source over said third and seventh switch means and which is actuated to open in response to the arrival of said second carrier member at the first position thereof.

9. A passive seat belt arrangement as claimed in claim 8, in which said sixth switch means comprise a coil connected to said power source over said first, second, third switch means and the normally closed limit switch of said fourth switch means and a normally open contact connected between said power source and said drive means and actuated to close when said coil is energized from said power source, and said seventh switch means comprise a coil which is connected to said power source over said third switch means and the normally closed limit switch of said fifth switch means and a normally open contact connected between said power source and said drive means and actuated to close when the coil of the seventh switch means is energized from said power source, said coil of the sixth switch means being energized from said power source when said first, second and third switch means are responsive concurrently to the energized condition of ignition system, the occupied condition of the seat and the closed condition of the door structure, respectively, and further concurrently the limit switch of said fourth switch means is responsive to the arrival of said second carrier member at the second position thereof, said coil of the seventh switch means being energized from said power source when said third switch means is responsive to the open condition of the door structure and concurrently the limit switch of said fifth switch means is responsive to the arrival of said second carrier at the first position thereof.

* * * * *